United States Patent [19]

Katakabe et al.

[11] Patent Number: 5,457,517
[45] Date of Patent: Oct. 10, 1995

[54] IMAGE FORMING APPARATUS HAVING A PLURALITY OF SUPPORT SURFACES

[75] Inventors: Noboru Katakabe, Uji; Masahiro Aizawa, Takatsuki; Shunji Onobori, Neyagawa; Teruyuki Naka, Izumi, all of Japan

[73] Assignee: Matsushita Electric Industrial Co., Ltd., Osaka, Japan

[21] Appl. No.: 162,431

[22] Filed: Dec. 2, 1993

[51] Int. Cl.⁶ .................................................... G03G 15/00
[52] U.S. Cl. ........................................ 355/200; 355/210
[58] Field of Search ................................... 355/200, 210, 355/215

[56] References Cited

U.S. PATENT DOCUMENTS

| | | | |
|---|---|---|---|
| 4,465,359 | 8/1984 | Nakahata | 355/215 |
| 4,635,010 | 1/1987 | Miyai et al. | 355/200 |
| 4,705,384 | 11/1987 | Mizutani et al. | 355/200 |
| 4,910,551 | 3/1990 | Onoda et al. | 355/200 |
| 5,345,297 | 9/1994 | Katakabe et al. | 355/260 |

FOREIGN PATENT DOCUMENTS

| | | |
|---|---|---|
| 2013370 | 10/1990 | Canada. |
| 0331324 | 9/1989 | European Pat. Off. . |
| 0509441 | 10/1992 | European Pat. Off. . |
| 0568924 | 11/1993 | European Pat. Off. . |
| 1900803 | 8/1969 | Germany. |
| 2353229 | 4/1975 | Germany. |
| 4011073 | 10/1990 | Germany. |
| 60-176060 | 9/1985 | Japan. |
| 3-101784 | 4/1991 | Japan. |
| 3-125163 | 5/1991 | Japan ..................................... 355/200 |
| 3-282488 | 12/1991 | Japan. |
| 1252494 | 11/1971 | United Kingdom. |
| 1445024 | 8/1976 | United Kingdom. |

OTHER PUBLICATIONS

European Search Report (93309648.9) dated Jul. 5, 1994.

*Primary Examiner*—A. T. Gimley
*Assistant Examiner*—Nestor R. Ramirez
*Attorney, Agent, or Firm*—Ratner & Prestia

[57] ABSTRACT

An image forming apparatus according to the present invention includes: a photosensitive body; an exposing device for irradiating the photosensitive body with a light to form a latent image on the photosensitive body; a developing device for developing the latent image formed on the photosensitive body to form a developer image; a transfer roller for transferring the developer image on a recording paper; a fixing device for thermally fixing a transferred image on the recording paper after image transference; and a case for accommodating the photosensitive body, the exposing device, the developing device, the transfer roller and the fixing device, the case having at least six planes, two or more of the planes provided around an axis of the photosensitive body, being placement planes which are usable as a bottom during an image forming operation. The fixing device is always above the photosensitive body and the developing device, regardless of which plane is selected from the two or more placement planes as a bottom when the apparatus performs the image forming operation.

17 Claims, 10 Drawing Sheets

IMAGE FORMING APPARATUS HAVING A PLURALITY OF SUPPORT SURFACES

BACKGROUND OF THE INVENTION

1. Field of the Invention

The present invention relates to an electrophotographic image forming apparatus for use in a copying machine, a laser beam printer, or the like.

2. Description of the Related Art

In recent years, this type of device is popular among personal users, and a smaller device produced at lower cost is required for satisfying personal user's needs.

In using such a small-sized apparatus, generally designed as a desk-top type, the user prefers to change its position or direction freely on the desk. The user wishes to make effective use of a limited desk space and to use the space in his or her own style. Therefore, it is desirable that the apparatus can be set in various attitudes by using the side or top planes of the body alternatively as a bottom supporting the apparatus body.

However, a conventional image forming apparatus is generally large-sized, and when placing the apparatus on a desk or the like, the plane to be the bottom is predetermined. Accordingly, the apparatus has to be placed in one specific attitude. Therefore, in designing the structure of the developing device or positional arrangement of various elements in the body, the possibility of the apparatus being used in various attitudes is not taken into consideration.

If placing the apparatus using different planes as a bottom, the apparatus body is turned in various directions. The positional relationship among elements provided in the body and the direction of gravity influence vary in accordance with the change of placement direction, whereby the stream of the moving developer and air flow change in the apparatus body. As a result, the following problems occur.

First, as for positional relationship among the elements, the elements located above a fixing device are heated by the air rising from the fixing device, which is a large heat source. This causes heat deformity and a change of characteristics in the elements.

Secondly, in the case of using a laser scanner as an exposure means, due to the change of placement attitude of the body, the shaft of the motor for revolving the mirror used in the laser scanner may be slightly shifted from its proper position by the influence of gravity. As a result, the accuracy of scanning by laser light is reduced, and then the quality of the developed image is degraded.

Further, in the developing device, the state of supplying developer changes depending on the gravity effect varying due to the change of the direction of supplying the developer to a photosensitive body. In such a state, an excessive supply of developer may cause the developer to clog or high density condition similar to this, which applies an extreme stress on the developer. Conversely, the amount of supplied developer may be insufficient.

Furthermore, if the attitude of the developing device itself is changed, the developer particles gather in the lower side in the developing device. Also, there is a need to forward and transport the developer against the gravity effect. These difficulties prevent the developer from being supplied uniformly to every portion of the developing section on the photosensitive body. Because of this, the stability of the developing performance is reduced.

SUMMARY OF THE INVENTION

The image forming apparatus of the present invention includes: a case having at least six planes among which two or more placement planes are usable as a bottom when placing the apparatus; a photosensitive body; an exposing device for irradiating the photosensitive body with a light to form a latent image on the photosensitive body; a developing device for developing the latent image formed on the photosensitive body to form a developer image; a transfer roller for transferring the developer image on a recording paper; and a fixing device for thermally fixing a transferred image on the recording paper after image transference; wherein the fixing device is always above the photosensitive body, the developing device, and the exposing device, whichever plane is selected from the two or more placement planes as a bottom when placing the apparatus.

In one embodiment of the present invention, the exposing device is a device of a solid scanning type.

In another embodiment of the present invention, the case has a paper supply slit for inserting the recording paper in the apparatus and a paper discharge slit for discharging the recording paper after image transference, on the planes other than the two or more placement planes.

In still another embodiment of the present invention, the image forming apparatus further includes: a sensor for detecting an attitude of the apparatus and outputting an attitude signal indicating the detected attitude; and a control circuit for inhibiting the apparatus from operating based on the attitude signal from the sensor when the apparatus is placed irregularly.

In still another embodiment of the present invention, the developing device includes: a hopper for accommodating and supplying a developer; a developer carrier member for transporting the developer carried on a surface thereof to a developing place; and a developer circulating path for circulating the developer between the hopper and the developer carrier member, the developer circulating path including a part of the hopper and a forward path and a backward path both of which extend from the hopper along the photosensitive body; the forward path and the backward path being located in parallel with the photosensitive body, and the hopper being located in the longitudinal direction at one end of the photosensitive body.

In still another embodiment of the present invention, the forward path is arranged to be always below the backward path, regardless of whichever placement plane is selected as a bottom.

In still another embodiment of the present invention, the backward path is arranged to be always below the forward path, regardless of whichever placement plane is selected as a bottom.

In still another embodiment of the present invention, the photosensitive body functions as the developer carrier member.

According to another aspect of the present invention, an image forming apparatus includes: a case having at least six planes among which two or more placement planes are usable as a bottom when placing the apparatus; a photosensitive body; an exposing device for irradiating the photosensitive body with a light to form a latent image on the photosensitive body; a developing device for developing the latent image formed on the photosensitive body to form a developer image; a transfer roller for transferring the developer image on a recording paper; and a fixing device for thermally fixing a transferred image on the recording paper after image transference; wherein the developing device includes a hopper for accommodating and supplying a developer; a developer carrier member for transporting the developer carried on the surface thereof to a developing place; and a developer circulating path for circulating the developer between the hopper and the developer carrier member, the developer circulating path including a part of the hopper and a forward path and a backward path both of which extend from the hopper along the photosensitive body; and the forward path and the backward path have respective spaces independent of each other, for holding the developer therein and transporting the developer.

In one embodiment of the present invention, the exposing device is a device of a solid scanning type.

In another embodiment of the present invention, the case has a paper supply slit for inserting the recording paper in the apparatus and a paper discharge slit for discharging the recording paper after image transference, on the planes other than the two or more placement planes.

In still another embodiment of the present invention, the image forming apparatus further includes: a sensor for detecting an attitude of the apparatus and outputting an attitude signal indicating the detected attitude; and a control circuit for inhibiting the apparatus from operating based on the attitude signal from the sensor when the apparatus is placed irregularly.

In still another embodiment of the present invention, the forward path and the backward path are located in parallel with the photosensitive body, and the hopper is located in the longitudinal direction at one end of the photosensitive body.

In still another embodiment of the present invention, the forward path is arranged to be always below the backward path, regardless of whichever placement plane is selected as a bottom.

In still another embodiment of the present invention, the backward path is arranged to be always below the forward path, regardless of whichever placement plane is selected as a bottom.

In still another embodiment of the present invention, the photosensitive body functions as the developer carrier member.

The image forming apparatus of the present invention constructed as above described has a plural planes usable as a bottom, and the fixing device is arranged to be always above the photosensitive body, the developing device and the exposing device, whichever plane is selected as a bottom from the above planes. Accordingly, the photosensitive body, the developing device and the exposing device are scarcely affected by the heat from the fixing device. This makes it possible to prevent each element from deforming or deteriorating by the heat. Also, this makes it possible to prevent the dissolution and solidification of the developer accommodated in the elements.

Further, in the image forming apparatus of the present invention, the hopper is located at one end of the photosensitive body in the longitudinal direction, and the developer supply to the developing place is performed by the developer circulating path. Because of this positional arrangement, the space around the photosensitive body can be used effectively. Also, since the degree of freedom of the developer in the developer circulating path is restricted, it is possible to supply the developer to the developing place, irrespective of the attitude of the apparatus body.

As for exposing device, in the case of using a device of a solid state scanning type, a large optical path like laser scanner is not required. This makes it easy to make the apparatus compact. Further, in changing the attitude of the apparatus, the absence of mechanical scanning section assures the stable image formation.

Further, this apparatus provides the sensor for detecting the attitude of the apparatus. In the case where the apparatus is detected to be irregularly set, by inhibiting the operation of apparatus with the use of the above control circuit, it becomes possible to avoid the troubles in advance such as a clog or a leak of the developer or poor image formation.

Thus, the present invention makes possible the advantage of providing an image forming apparatus always capable of stable image formation even if changing the attitude of apparatus body.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the drawings.

EXAMPLE 1

Figure 1:
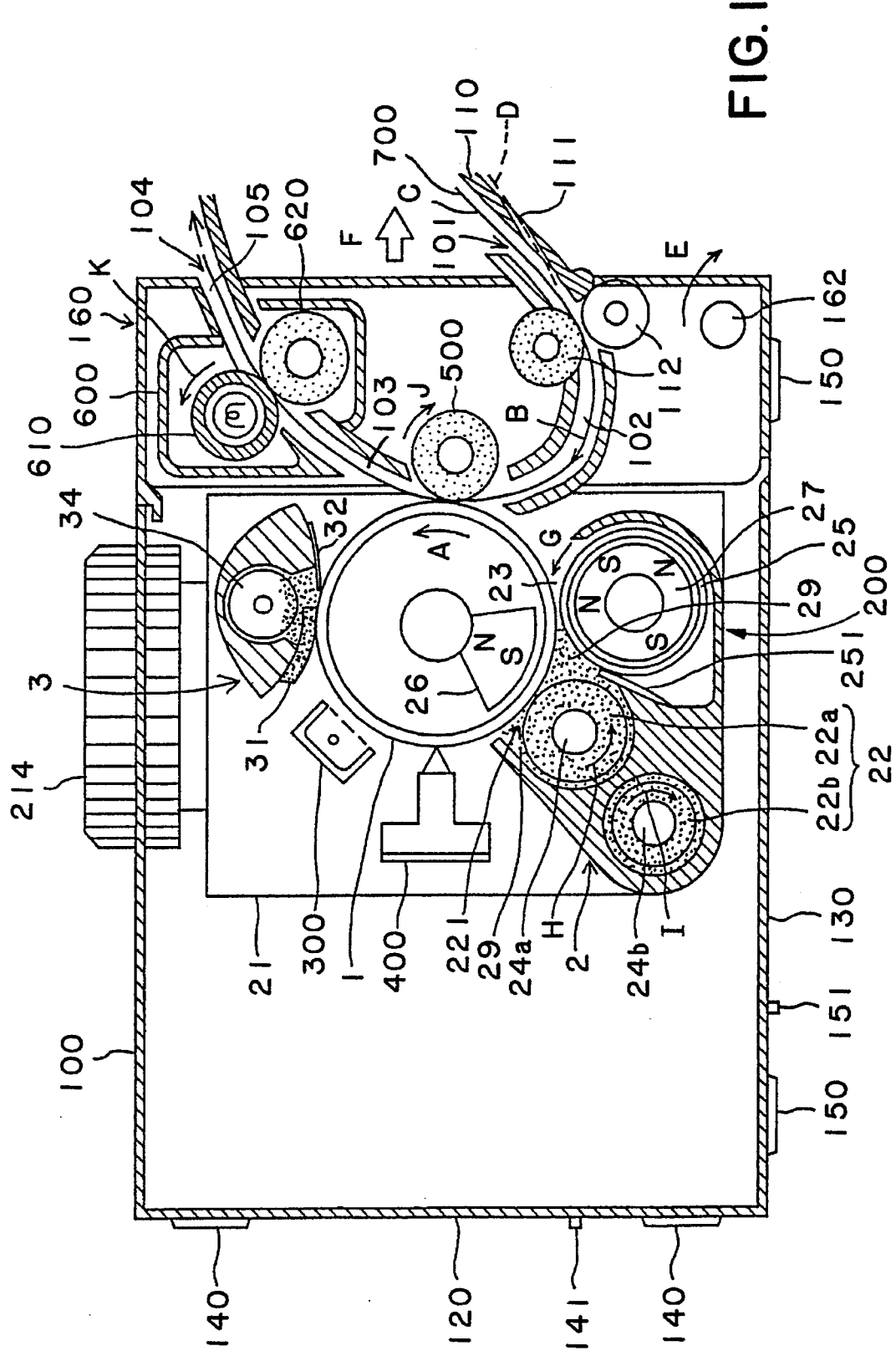
FIG. 1 is a cross-sectional view showing an image forming apparatus of Example 1 according to the present invention.
Figure 2:
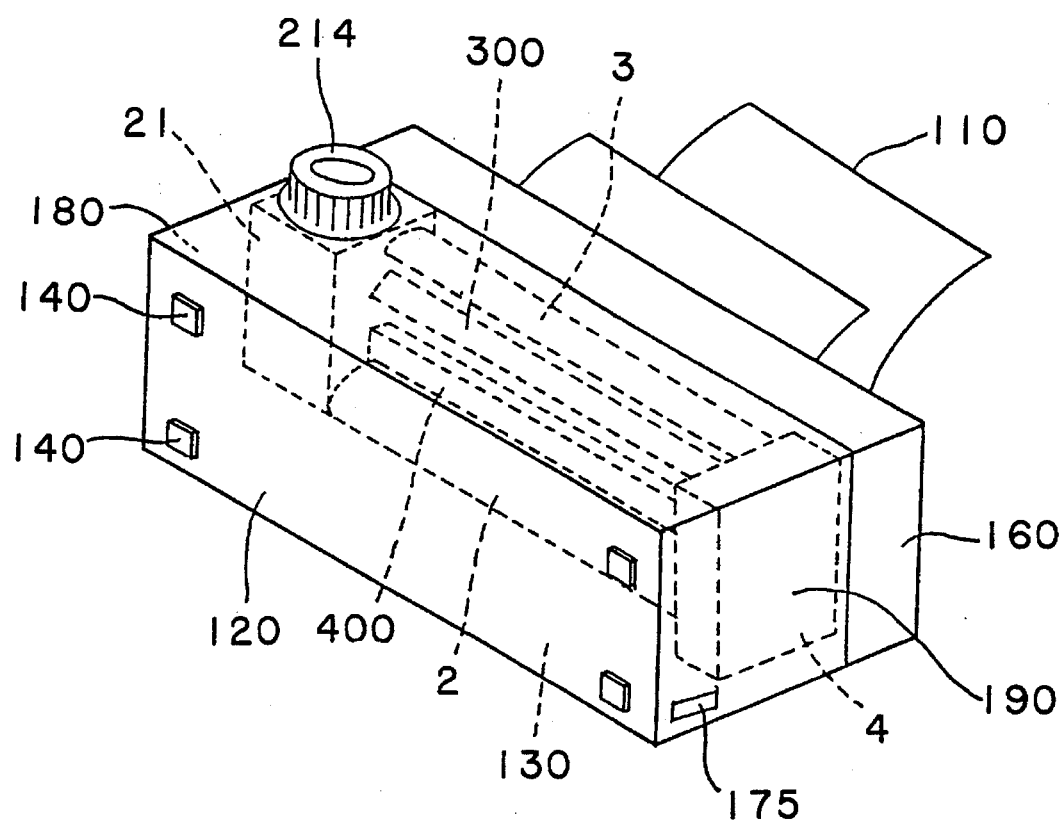
FIG. 2 is a perspective view of the image forming apparatus of Example 1.

The construction of an image forming apparatus of the present example will be described with reference to FIGS. 1 and 2. FIG. 1 is a cross-sectional view showing an image forming apparatus seen from the side, and FIG. 2 is a perspective view showing the same. A developing device according to the present invention is provided in a simple and compact image forming apparatus suitable for personal uses, which is especially connected to a personal computer.

As shown in FIGS. 1 and 2 this image forming apparatus has a case 100, an image forming unit 200, a charger 300, a printer head 400, a transfer roller 500, and a fixing device 600. The image forming unit 200 includes a photosensitive body 1, a developing device 2, a cleaner 3 and a drive mechanism 4. The photosensitive body 1 rotates in the direction of an arrow A. The charger 300, the printer head 400, the developing device 2, the transfer roller 500 and the cleaner 3 are disposed in this order around the circumference of the photosensitive body 1 in the direction of the arrow A.

Hereinafter, an operation of the image forming apparatus constructed as above will be described.

When an output command is given to the image forming apparatus, the drive mechanism 4 including a motor (not shown) starts a driving operation, and each of the components connected to the drive mechanism 4 operates. First, the photosensitive body 1 starts rotating in the direction shown by the arrow A. As soon as the photosensitive body 1 starts rotating, the charger 300 is turned ON to supply a predetermined amount of charge to the photosensitive body 1, and uniformly charges the photosensitive body 1 so that the surface potential thereof is approximately −550 V, for example.

When the charged surface of the photosensitive body 1 reaches the printer head 400, an image signal is supplied to the printer head 400. The charged surface is successively irradiated with light by the printer head 400 in accordance with the image signal. Thus, an electrostatic latent image is formed on the photosensitive body 1.

The electrostatic latent image formed on the photosensitive body 1 is developed by the developing device 2, whereby a developer image is formed on the photosensitive body 1. This developing operation will be described later in detail.

In this developing operation, a recording paper 700, sandwiched between the transfer roller 500 and the photosensitive body 1, is fed one after another. A bias voltage (e.g., approximately +1 kv) is applied to the transfer roller 500, and a negatively charged developer on the photosensitive body 1 is transferred onto the recording paper 700.

Then, the recording paper 700 on which the developer image is transferred passes through the fixing device 600, and the developer image is thermally fixed therein. Thereafter, the recording paper 700 is discharged from the image forming apparatus.

On the other hand, a part of a developer remaining on the photosensitive body 1 after the transfer operation is removed by the cleaner 3. The photosensitive body 1 thus cleaned returns to the charge position again, and is ready to repeat the above-mentioned operation again. After completing an image forming operation for one sheet of recording paper 700, the photosensitive body 1 stops. Further, according to the present example, the removed developer is collected and reused, as described later.

A construction and operation of each of the above-mentioned elements will be described in detail.

Case 100

At a position corresponding to a transfer section between the photosensitive body 1 and the transfer roller 500 on the external surface of the case 100, a paper supply slit 101 for manual feeding is disposed. The paper supply slit 101 has a paper guide 110 and a paper feeding rollers 112. The paper feeding rollers 112 rotates so as to send the recording paper 700 to the transfer section with a predetermined timing in a series of operations of the image forming apparatus as described above. Between the image forming unit 200 and the external surface of the case 100 having the paper supply slit 101, a paper feeding path 102 extending from the paper supply slit 101 is disposed. The recording paper 700, supplied from the paper supply slit 101, is transported to the transfer section via the paper feeding path 102, as shown by an arrow B. On the downstream side of the transportation of the recording paper 700 of the transfer section, a transporting path 103 for transporting the recording paper 700 from the transfer section to the fixing device 600 is disposed. On the external surface of the case 100, at a position corresponding to the fixing device 600, a paper discharge slit 104 is disposed. On the downstream side of the transportation of the recording paper 700 of the fixing device 600, a paper discharge path 105 for transporting the recording paper 700 from the fixing device 600 to the paper discharge slit 104 is disposed.

As shown in FIG. 2, the shape of the case 100 is substantially a rectangular parallelopiped and has six planes. According to the present invention, two planes can be selectively used for placing. That is, a plane 120 opposed to the plane on which the paper supply slit 101 is disposed and a plane 130, which is adjacent to the plane 120, among four planes surrounding an axis of the photosensitive body 1. According to the present invention, the paper supply slit 101 is disposed on the side of the plane opposed to the plane 120 so as to be close to the plane 130, and the paper discharge slit 104 is disposed on the plane opposite to the plane 120 so as to be away from the plane 130. In this way, the recording paper 700 can be easily discharged irrespective of whether the plane 120 or 130 is made a placing plane.

The paper guide 110 has a slit 111 extending in parallel with an axial direction of the photosensitive body 1. This makes is possible to supply and discharge the recording paper 700, irrespective of whether the plane 120 or 130 is selected as a placing plane. In the case where the plane 120 is selected, the recording paper 700 is guided and fed in the direction shown by the solid line C. In the case where the plane 130 is selected, the recording paper 700 is guided and fed through the slit 111 in the direction shown by the broken line D.

The planes 120 and 130 respectively have projections at corners thereof. Because of this, the image forming apparatus is stably placed. These projections 140 and 150 are preferably made of rubber or the like, for preventing slip.

As shown in FIG. 1, the planes 120 and 130 respectively have detecting sensors 141 and 151, each of which has a detecting element protruding slightly further than the projections 140 and 150. The respective sensor 141 or 151 is pressed by a plane on which the apparatus is placed, such as the surface of desk, and is turned ON when the corresponding plane 120 or 130 serves as a bottom.

Further, a power supply switch 175, wires and/or connectors (not shown) for signal connection with an external apparatus like a personal computer are located on two planes 180 and 190 of the case 100 opposite to each other in the axial direction of the photosensitive body 1. The two planes 180 and 190 are prevented from being erroneously used as a bottom since the planes 180 and 190 cannot stably hold the apparatus body. This makes it possible to prevent such troubles as clog of developer.

An open-and-close section 160 (upper right portion in FIG. 1 has a paper feeding section including the paper feeding path 102, the paper transporting path 103, and the paper discharge path 105 and the like, in addition to the transfer roller 500, and the fixing device 600. This open-and-close section can be opened for removing jammed paper, repairing the apparatus in the event of a failure and the like. The open-and-close section 160 is rotatable in the direction of an arrow E around a shaft 162 extending in parallel with the axial direction of the photosensitive body 1. Thus, the right hand side of the image forming unit 200 shown in FIG. 1 (i.e., the open-and-close section 160) is completely released therefrom, and the image forming unit 200 can be detached in the direction of an arrow F through the opening formed by this release. The detaching direction is freely set, depending on the arrangement of other elements and the open-and-close structure of each section of the case 100.

Image forming unit 200

(1) Photosensitive body 1

A conventional photosensitive body is used in the present invention. However, there is no particular restriction in the type of the photosensitive body 1.

(2) Developing device 2

The construction of the developing device 2 will be described with reference to FIGS. 3 to 9.

Figure 3:
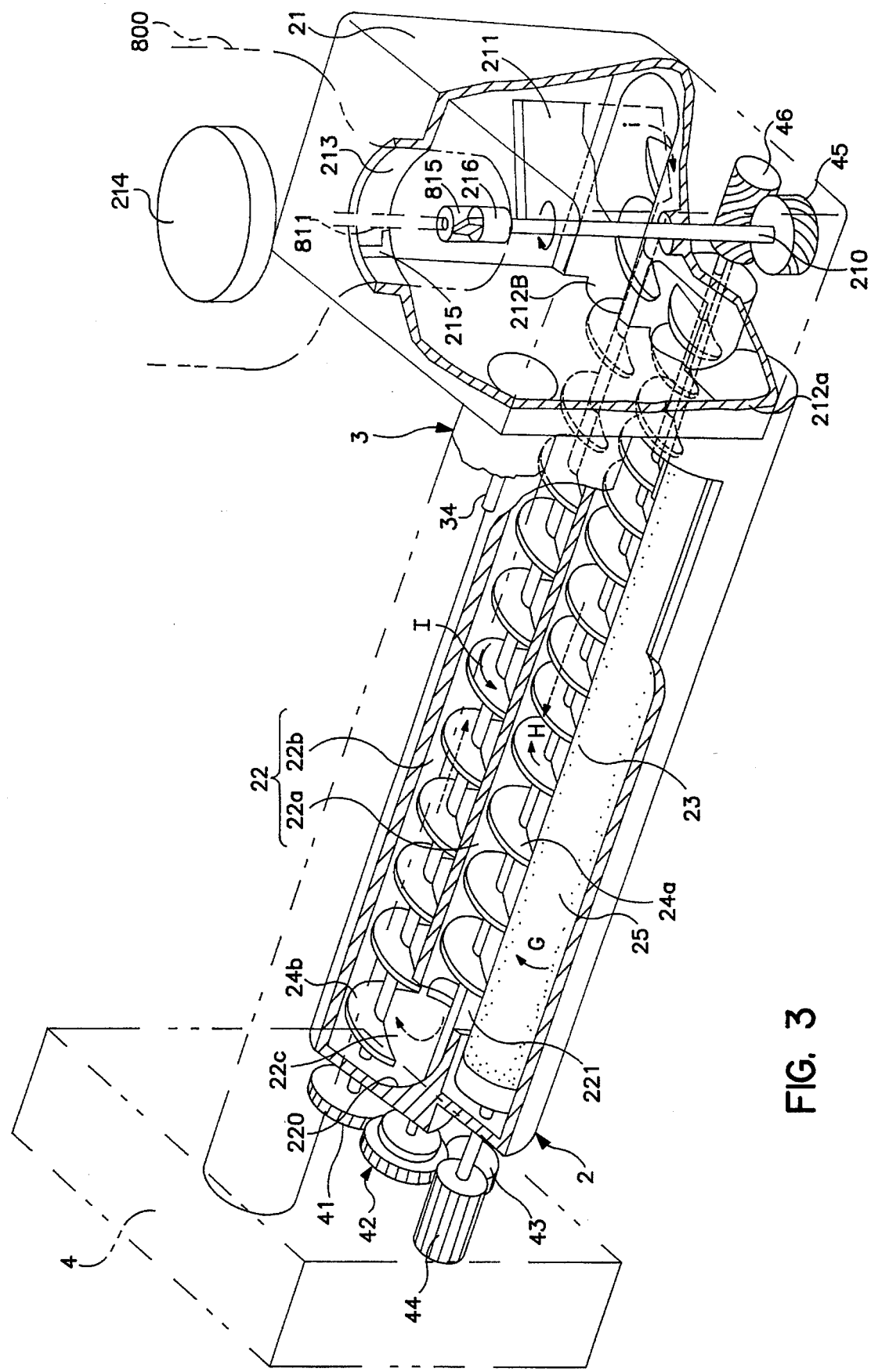
FIG. 3 is a partially cutaway perspective view of a developing device according to the present invention.
Figure 4A:
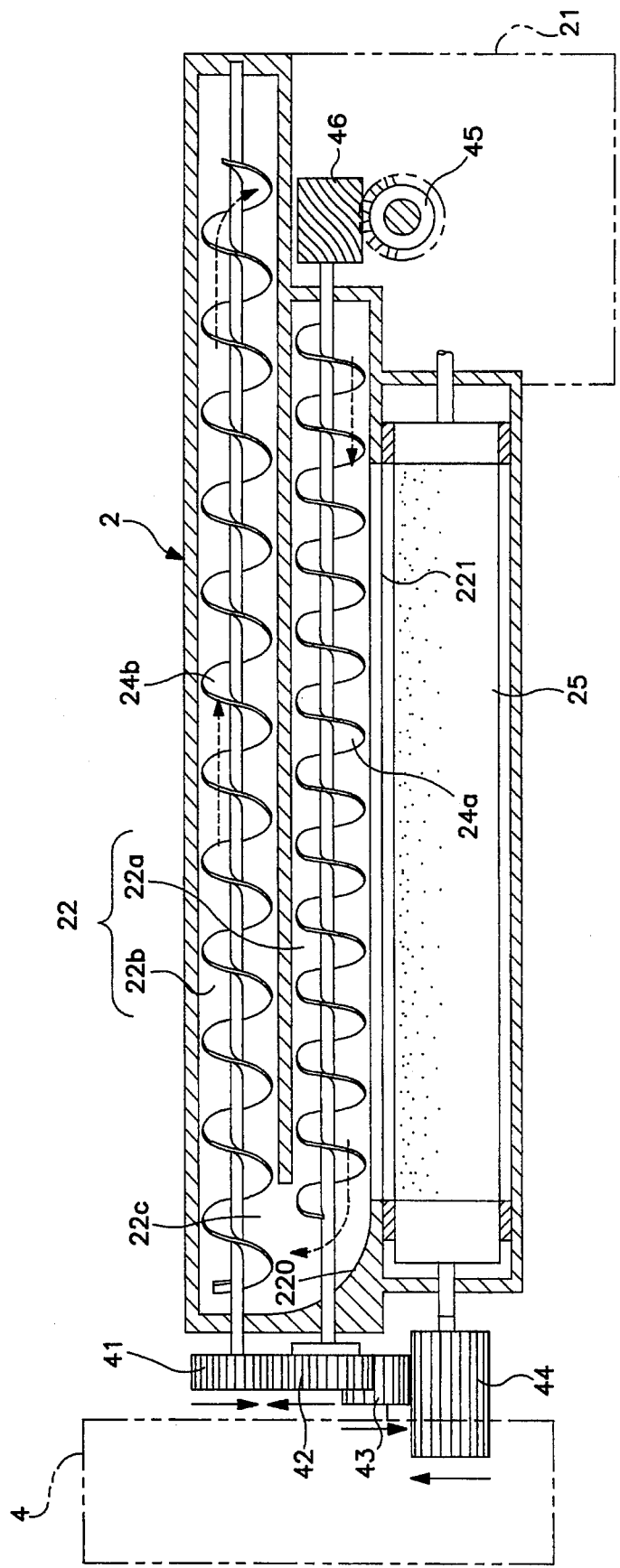
FIG. 4A is a cross sectional view of a developing device shown in FIG. 3 seen from above.

FIG. 3 is a partially cutaway perspective view of the developing device 2, and FIG. 4A is a cross-sectional view of the same seen from above. As shown in these figures, the developing device 2 has a hopper 21, a developer transporting pipe 22, and a recovering roller 25. The hopper 21 accommodates and supplies the developer. The developer transporting pipe 22 for transporting the developer supplied from the hopper 21. The recovering roller 25 forms a developer image by recovering the extra particles of developer.

The outline of a developing operation in the developing device 2 having the above-mentioned structure will be described.

The developer used for development is transported from the hopper 21 to the surface of the photosensitive body 1 through the developer transporting pipe 22 and arbitrarily supplied both to an image area and a non-image area on the photosensitive body 1. The developer supplied to the photosensitive body 1 is kept in a developing place 23, a portion between the photosensitive body 1 and the recovering roller 25. At the developing place, an AC electric field is formed in addition to a DC electric field. Because of this, the developer supplied to the non-image area and the extra part of developer supplied to the image area are recovered by the recovering roller 25. Thus, the proper amount of developer is adhered only to the image area, whereby development is performed.

Hereinafter, a structure and operation of each member of the developing device 2 will be described.

(A) Hopper 21

Figure 5:
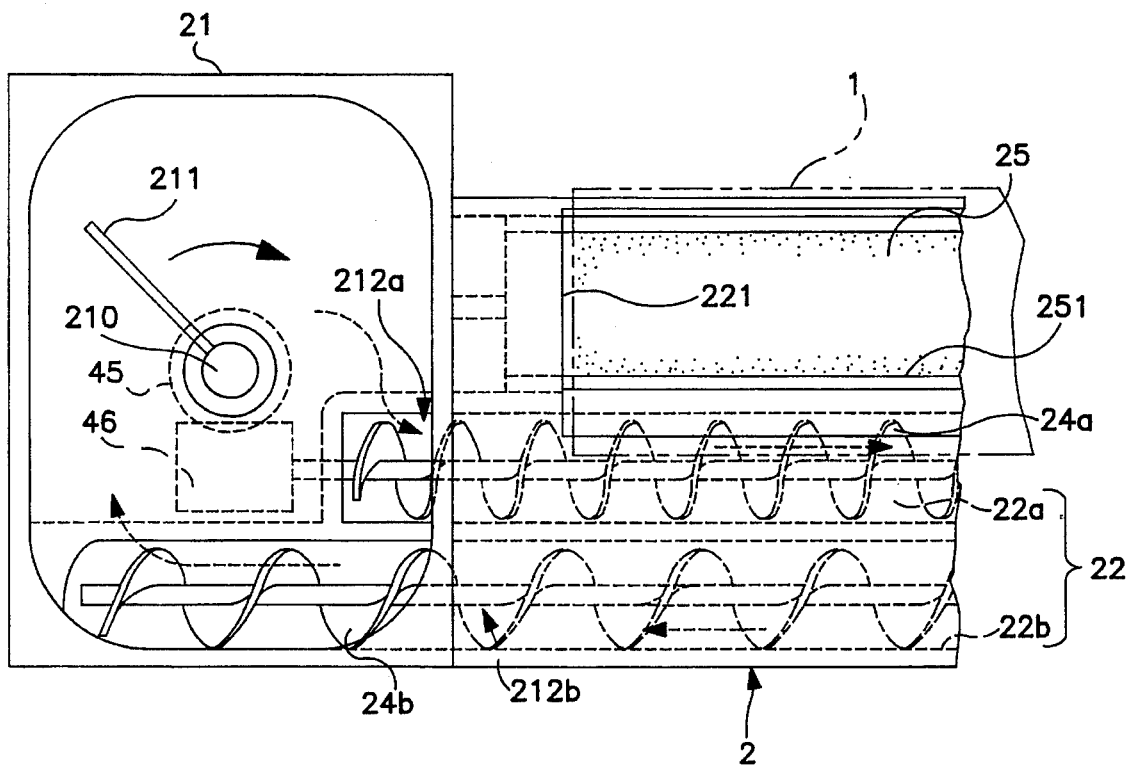
FIG. 5 is a top plan view showing a part of an image forming apparatus of FIG. 3 on the hopper side.
Figure 6:
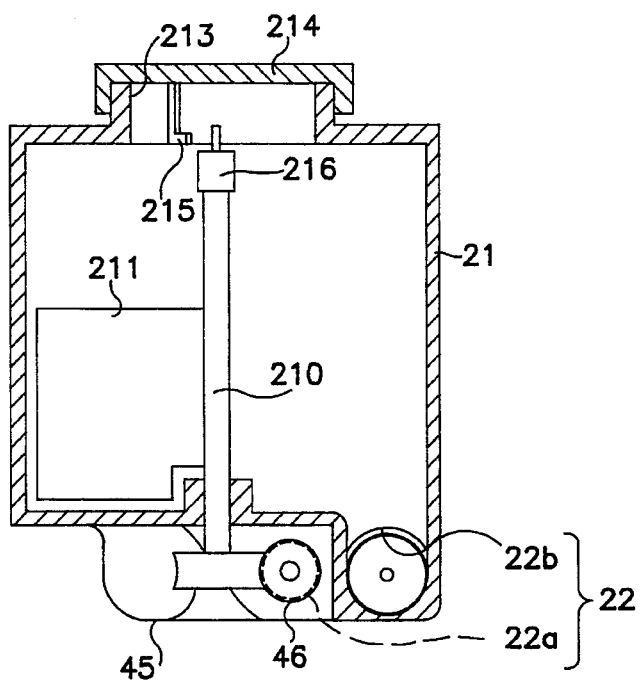
FIG. 6 is a longitudinal sectional view of a hopper of the image forming apparatus of FIG. 3.
Figure 7:
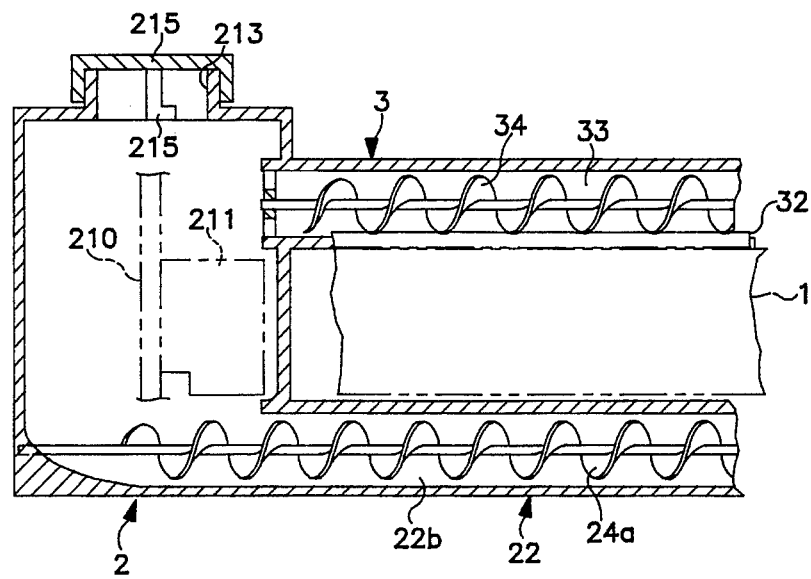
FIG. 7 is a longitudinal sectional view of a part of the image forming apparatus of FIG. 3 seen from the front.

FIG. 5 shows an enlarged view of the hopper 21 and its vicinity. FIG. 6 is a longitudinal sectional view of the hopper 21 seen from the side. FIG. 7 is a longitudinal sectional view of the hopper 21 portion, including the cleaner 3, seen from the front.

As shown in these figures, the hopper 21 is arranged outside of the edge in the longitudinal direction of the photosensitive body 1. The hopper 21 has a developer refill port 213 in its upper portion, through which the developer is supplied into the hopper 21. On the internal side plane of the developer refill port 213, a fit groove 215 in the shape of key is provided. In the hopper 21, a stirring blade 211 which rotates around a rotation shaft 210 vertically extending is disposed. The rotation shaft 210 extends towards the lower outside of the hopper 21. A gear 45 is disposed on the bottom edge of the rotation shaft 210, and a coupling 216 is disposed on the top edge thereof. Over the developer refill port 213, a cover 214 is disposed. As shown in FIG. 5, the hopper 21 has a developer outlet 212a for supplying the developer to the developer transporting pipe 22, and a developer inlet 212b for receiving the developer returning to the hopper 21 from the developer transporting pipe 22 without being used for development.

Developer refill container 800

Figures 8A, 8B:
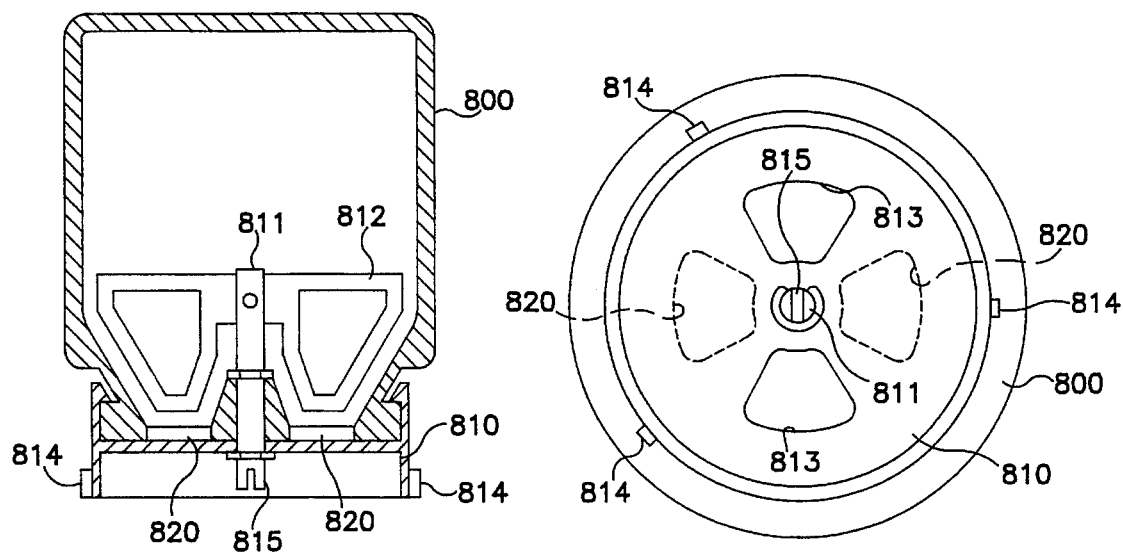
FIG. 8A is a cross-sectional view showing a developer refill container.
FIG. 8B is a top plan view showing the developer refill container.

A developer refill container 800 shown in FIG. 8A is used for refilling the developer in the hopper 21. The developer refill container 800 has a cylindrical shape. On the bottom thereof, two developer discharge outlets 820 are disposed in the circumferential direction as shown in FIG. 8B. Further, the developer refill container 800 has a cap 810 on its bottom, whereby these developer discharge outlets 820 are covered. The cap 810 has a stirring blade 812 rotatable around a rotation shaft 811 in the developer refill container 800, and the cap 810 itself is rotatable around the rotation shaft 811. The cap 810 has openings 813 corresponding to the developer discharge outlets 820. When these openings 813 fit in the developer discharge outlets 820, the developer in the developer refill container 800 can be discharged. On the outside of the cap 810, a coupling 815 connected to the rotation shaft 811 is provided, and projections 814 are formed on the periphery of the cap 810.

The hopper 21 has a developer refill container detecting sensor (not shown in FIG. 8A) for detecting that the developer refill container 800 is attached to the hopper 21. Various kinds of sensors such as a photosensor and a limit switch are usable for this developer refill container detecting sensor, which makes it possible to detect the attachement of the developer refill container 800 to the hopper 21, optically, electrically or mechanically.

Next, an operation of the developer refill container 800 will be described.

As shown in FIG. 3, at the time of refilling developer, the cover 214 is removed from the developer refill port 213, and the developer refill container 800 is attached to the developer refill port 213, whereby the developer is refilled in the hopper 21. In the attachment of the developer refill container 800, after the projections 814 of the developer refill container 800 is fit into the fit groove 215 of the hopper 21, the developer refill container 800 is fully pushed and revolved. Since the cap 810 is fixed, the cap 810 rotates with respect to the developer refill container 800, whereby the openings 813 of the cap 810 are aligned with the developer discharge outlets 820. In this way, the developer in the developer refill container 800 falls into the hopper 21 through the developer discharge outlets 820 and openings 813.

The coupling 815 on the rotation shaft 811 of the developer refill container 800 is automatically connected to the coupling 216 on the rotation shaft 210 of the hopper 21. Thus, the stirring blade 812 in the developer refill container 800 is driven for rotation in association with the rotation of the stirring blade 211 in the hopper 21. By the rotation of the stirring blade 812, the developer is smoothly moved from the developer refill container 800 to the hopper 21. This makes the time required for refilling the developer shorter. As a result, the standby time for image forming is shortened.

Further, since the stirring blade 812 and the stirring blade 211 in the hopper 21 are simultaneously driven, the developer can be successively supplied to the hopper 21 and then transported to the developing place 23. That is, the developer supplied to the hopper 21 is stirred and spread evenly by the stirring blade 211. This stirred developer is smoothly fed out into the developer transporting pipe 22 by means of a screw 24*a* disposed in a forward path 22*a* extending into the hopper 21. In this way, the developer is stably transported. Since the supply and transportation of the developer are completed in a short period of time, it is possible to stably supply the developer to the developing place 23 for development without an initializing operation after the supply of the developer or standby time required for this operation. Accordingly, there is an advantage that the image forming operation can be started immediately after the developer is supplied.

(B) Developer transporting pipe 22

As shown in FIG. 3, the developer transporting pipe 22 has the forward path 22*a* for forwarding the developer from the hopper 21, a backward path 22*b* for backwarding the developer once fed into this forward path 22*a*, and a connecting path 22*c* for connecting a first end of the forward path 22*a* and a first end of the backward path 22*b*. The forward path 22*a* and the backward path 22*b* extend in parallel with the axial direction of the photosensitive body 1. The forward path 22*a* and the backward path 22*b* respectively have spaces independent of each other, and respectively extend from the hopper 21 in parallel with the axial direction of the photosensitive body 1. A second end of the forward path 22*a* is connected to the developer outlet 212*a* of the hopper 21, and a second end of the backward path 22*b* is connected to the developer inlet 212*b* of the hopper 21. In this way, the forward path 22*a*, the backward path 22*b*, and the connecting path 22*c* form a continuous path for circulating the developer, including the hopper 21 as a part thereof. Since the developer transporting pipe 22 forms a closed space together with the photosensitive body 1 and the recovering roller 25, any particles of the developer does not scatter out of the closed space. The photosensitive body 1 functions as a developer carrier body for transporting the developer to the developing place 23.

The forward path 22*a* has a developer supply opening 221 in a position opposed to the photosensitive body 1, for supplying the developer directly to the surface of the photosensitive body 1. The developer supply opening 221 is large enough for the developer in a sufficient amount to be adhered both to an image area and a non-image area on the photosensitive body 1.

Figure 9:
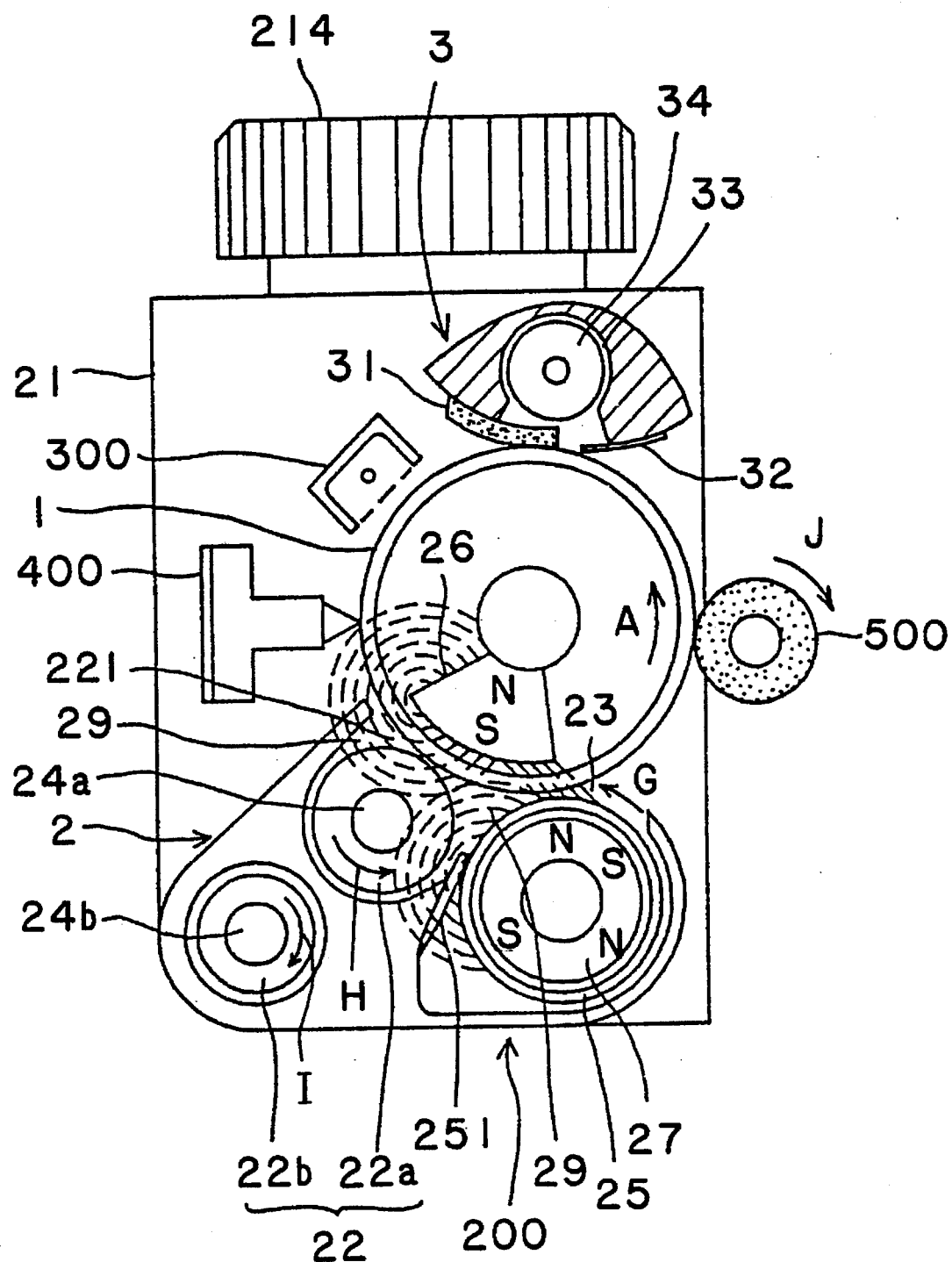
FIG. 9 is a cross-sectional view of an image forming unit of the image forming apparatus of FIG. 1.

As shown in FIGS. 1 and 9, the forward path 22*a* and the developer supply opening 221 are both provided beneath the photosensitive body 1 at an angle of about 45 degrees from the horizontal plane of the photosensitive body 1. Due to this arrangement, the developer supplying condition remains almost the same, irrespective of whether the apparatus is placed on the plane 120 or on the plane 130 of the case 100. Further, since the developer is always supplied to the photosensitive body 1 from below, whichever plane (i.e., the plane 120 or 130) is selected for placing, the excess supply of the developer caused by gravity can be prevented. Also, it avoids clogging the space with the particles of developer and thus applying extreme pressure to the developer.

Further, it is possible to effectively supply the developer by utilizing the force of a magnetic field. FIG. 9 is an enlarged longitudinal cross-sectional view of the developing device 2 and the vicinity thereof. As shown in FIG. 9, a sector-shaped magnet 26 is provided in the photosensitive body 1. A magnetic field as shown by broken lines in FIG. 9 is formed by means of the magnet 26 and a cylindrical magnet 27 (described later) located in the recovering roller 25. The developer transported in the forward path 22*a* is attracted and adhered to the surface of the photosensitive body 1, by a magnetic force of the magnetic field of the magnet 26. In the present example, a magnetic monocomponent developer is used.

A screw 24*a* and a screw 24*b* are provided in the forward path 22*a* and the backward path 22*b*, respectively. The screws 24*a* and 24*b* have a lead in the same direction with each other. The inner wall of the screws 22*a* and 22*b* are adjacent to the periphery of the screws 24*a* and 24*b*, respectively. Thus, it is possible to hold the particles of the developer in the spaces around the blades of the screws 24*a* and 24*b* against the influence of gravity, even when the developing device 2 is pulled out from the case 100, or when the direction of operation or placement is changed. Accordingly, the developer is prevented from gathering in either end of the developer transporting pipe 22, or in either side of the forward path 22*a* or the backward path 22*b*.

In the above-mentioned closed space, there is a developer idle space 29 free from the transporting force of the screw 24*a*. The developer idle space 29 is formed among the screw 24*a* in the forward path 22*a*, the photosensitive body 1 and the recovering roller 25. In the developer idle space 29, the developer is likely to flow without being caught therein, because it is free from the transporting force of the screw 24*a* or the carrying force of the photosensitive body 1 and the recovering roller 25. In the present example, however, a magnetic field formed between the magnet 26 in the photosensitive body 1 and the magnet 27 in the recovering roller 25 is formed in this developer idle space 29, and the strength of the magnetic field is set to a magnetic force strong enough to hold the developer against gravity. Therefore, the above-mentioned gathering of the developer is reliably prevented, even if the direction of the apparatus is variously changed. It is also possible to dispose a magnet in the vicinity of the developer transporting pipe 22 in addition to the magnets 26 and 27 to form the magnetic field, which has the developer caught in the developer idle space 29.

Also, by forming the magnetic field, which is caused by the magnets 26 and 27, in the screws 24*a* and 24*b*, the developer is caught more reliably by the screws 24*a* and 24*b*. In order to form such a magnetic field, the magnets 26 and 27 may be strengthen, or another magnet may be provided.

As shown in FIG. 4A, a guide plane 220 (a sidewall having a slope) is provided at the first end of the forward path 22*a*. This improves the transportation of the developer from the forward path 22*a* to the backward path 22*b*.

Also, as shown in FIG. 4A, the width of the connecting path 22*c* connecting the forward path 22*a* and the backward path 22*b* is made larger than that of the forward path 22*a*, and the screw 24*a* is not provided in this portion. Accordingly, the developer transported to the first end of the forward path 22*a* by the screw 24*a* is pushed to the side of the backward path 22*b*, and the pushed developer is caught by the screw 24*b* and forwarded into the backward path 22*b*.

In the present example, since a part of the screw 24a is removed at the first end of the forward path 22a where a part of the wall separating the forward path 22a from the backward path 22b is removed, and the connecting path 22c is widened therein, the developer forwarded to this place is smoothly delivered to the adjacent backward path 22b. Thus, the transporting direction of the developer is reliably changed within a narrow space. If the screw 24a extends further closer to the guide plane 220, the developer is compressed to the side wall before being delivered to the backward path 22b, causing the developer to clog.

In the present example, the leads of the screws 24a and 24b are gradually enlarged so as to be larger at downstream than at upstream. As a result, even in the case where the screws 24a and 24b are rotated at a constant speed, the developer transporting ability is appropriately made larger while being transported from the developer outlet 212a of the hopper 21, via the forward path 22a and the backward path 22b, to the developer inlet 212b of the hopper 21. That is, the developer receives more transporting force as it is traveling to the downstream, and finally released from the force when it is fed into the hopper 21 having a large capacity. Accordingly, it is possible to prevent the developer from clogging in the course of transportation or from being degraded under extreme stress due to high density similar to the clogging state. However, the lead of the screw 24a is constant in a position corresponding to the developer supply opening 221. If the lead is not constant, the amount of the developer supplied to the photosensitive body 1 varies in the axial direction of the photosensitive body 1, due to the difference in the transporting speed of the developer.

If the leads of the screws 24a and 24b are large, the force of holding the developer is weak. Accordingly, the developer is not held sufficiently between the blades of the screw 24a and the screw 24b, and the above-mentioned effect of preventing the developer from gathering is reduced. Such a problem is solved by providing a number of blades.

The screw 24a in the forward path 22a is provided so that a part thereof extends in the hopper 21 at the developer outlet 212a. This makes it possible to conveniently catch the developer in the hopper 21 and forward it reliably. At the developer outlet 212a of the hopper 21, the developer transporting ability of the screw 24a is set so as to be larger than that of the photosensitive body 1 for transporting the developer to the developing place 23. The reason for this setting is as follows:

In general, the developer transporting ability of the photosensitive body 1 is set so as to be sufficient for forming a whole surface solid black image. However, there is a possiblity that the shortage of the developer supply amount is caused in the case where the developer transported through the developer transporting pipe 22 is decreased in amount while such a solid black image is repeatedly formed. The above-mentioned setting can avoid this shortage. Thus, an image density is stably maintained to be constant.

The setting of the developer transporting ability of the screws 24a and 24b can also be appropriately adjusted by modifying the diameter or driving speed of the screws 24a and 24b, in addition to the above-mentioned configuration of the leads.

As for the arrangement of the forward path 22a and the backward path 22b, the forward path 22a is always located above the backward path 22b, irrespective of whether the plane 120 or the plane 130 is selected for placing. Accordingly, it is possible to use gravity for changing the direction of transporting the developer in the connecting path 22c, and there is an advantage in that the developer does not clog.

Figure 4B:
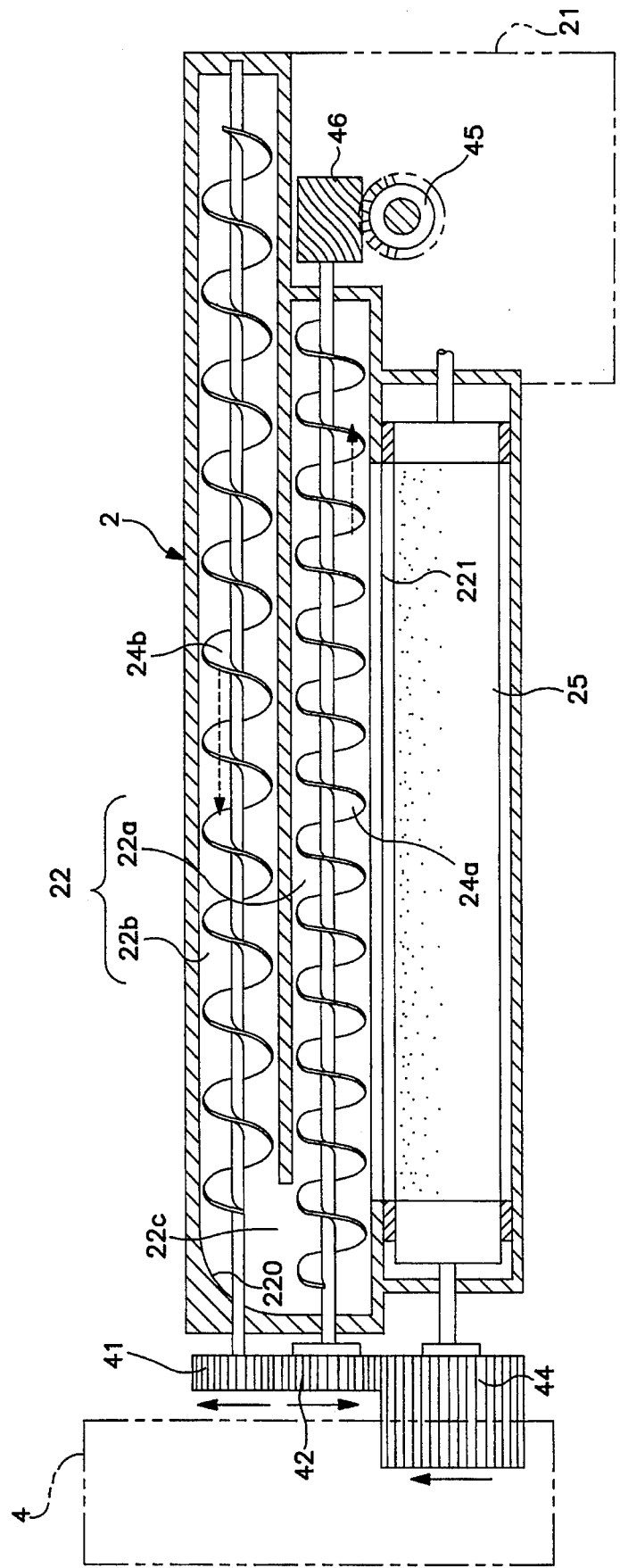
FIG. 4B is a cross sectional view of another developing device according to the present invention seen from above.

Alternatively, the forward path 22a and the backward path 22b can be transposed with each other as shown in FIG. 4B. In such an arrangement, the forward path 22a is always located below the backward path 22b, irrespective of whether the plane 120 or the plane 130 is selected for placing. Accordingly, it is possible to take the developer positioned at the bottom of the hopper 21 for development. Either the plane 120 or the plane 130 can be always used for placing.

The rotation direction of the screw 24a and the screw 24b is opposite to the rotation direction thereof shown in FIG. 4A. Accordingly, in the case shown in FIG. 4B, an idle gear 43 shown in FIG. 4A is unnecessary, and it is sufficient that the drive mechanism 4 directly drives a gear 44 by engaging a gear 42 connected to the screw 24b of the forward path 22b with the gear 44 connected to a rotation shaft of the recovering roller 25. As shown in FIG. 4B, the lead of the screws 24a and 24b is smaller on the side of forward path 22a and larger on the side of backward path 22b, and thereby the developer transporting ability is optimized. Also, the guide plane 220 is provided on the side of the forward path 22a in the connecting path 22c.

As described above, in the developing device 2 of the present example, the hopper 21 is located at the first end of the longitudinal direction of the photosensitive body 1, and the forward path 22a and the backward path 22b extend from the hopper 21 in parallel with the photosensitive body 1. Accordingly, only the forward path 22a and the backward path 22b are located around the periphery of the photosensitive body 1, and the hopper 21 is not located around the photosensitive body 1. Further, the forward path 22a and the backward path 22b are formed at a distance as short as possible for transporting the developer. Therefore, the space occupied by the developing device 2 around the periphery of the photosensitive body 1 is greatly reduced, thus miniaturizing the image forming apparatus.

(C) Recovering roller 25

A voltage is applied to the recovering roller 25 for forming the above-mentioned AC electric field with the DC electric field superimposed. In the present example, an AC voltage having a peak-to-peak voltage of 1.8 KV and a frequency of 1.5 kHz with a DC voltage of −300 V superimposed is supplied to the recovering roller 25, the surface potential of the photosensitive body 1 being approximately −550 V. Thus, the developer on a non-image area is effectively attracted to be removed by using an electric force obtained by functioning as an AC electric field in addition to a DC electric field between the photosensitive body 1 and the recovering roller 25. In the developer contacting the surface of the non-image area, the particles of the bottom part (i.e., the part which is directly in contact with the surface) are in a relatively stable condition. However, the particles of the upper part of the developer are in a relatively free condition or in a completely free condition. Therefore, the developer can be removed from the non-image area by vibrating the particles of the upper part of the developer by the electric field, and then colliding the particles against the stabilized particles of the bottom part. In this way, the developer adhering to the non-image area can be effectively attracted to the side of the recovering roller 25 and removed.

For improving the efficiency of recovering unnecessary developer, it is possible to use a force by the magnetic field in addition to the above electric force. As described in the foregoing, the magnetic field as shown in FIG. 9 is formed by means of the magnet 26 in the photosensitive body 1 and the cylindrical magnet 27 in the recovering roller 25. The developer adhering to the non-image area can be effectively attracted to the side of the recovering roller 25 and removed by means of this magnetic field.

The developer on the recovering roller 25 thus removed from the non-image area is recovered in the forward path 22a by the rotation of the recovering roller 25. The recovering roller 25 rotates in the direction shown by an arrow G. A recovering blade 251 is located between the recovering roller 25 and the forward path 22a. The developer attracted by the recovering roller 25 is removed from the recovering roller 25 by the recovering blade 251. The recovering blade 251 also seals the space between the developer supply opening 221 and the recovering roller 25 so as to prevent the developer from flowing out from this space.

Hereinafter, an operation of the developing device 2 will be described.

Referring to FIGS. 3 and 4A, when the drive mechanism 4 starts driving, an idle gear 43 provided on the drive mechanism 4 rotates. As shown in these figures, the idle gear 43 is engaged with a gear 44 provided at one end of the shaft of the recovering roller 25. The shaft of the recovering roller 25 rotates in the direction shown by the arrow G at a predetermined rotational ratio with respect to the idle gear 43.

The idle gear 43 is engaged with the gear 42 provided at one end of the shaft of the screw 24a, and the gear 42 is directly engaged with a gear 41 provided at one end of the shaft of the screw 24b. Accordingly, by the rotation of the idle gear 43, the shaft of the screw 24a rotates in the direction shown by an arrow H, and the shaft of the screw 24b rotates in the direction shown by an arrow I. Namely, these two shafts rotate in directions opposite to each other at a predetermined rotational ratio. The developer is transported in the opposite direction to each other by this rotation, since the direction of the lead of the screw 24a is the same as that of the screw 24b.

A gear 46 is provided at the other end of the shaft of the screw 24a, as shown in FIGS. 3 and 4. The gear 46 engages the gear 45 provided on the rotation shaft 210 of the hopper 21, serving as a worm gear. Thus, the stirring blade 211 of the hopper 21 rotates simultaneously with the rotation of the shaft of the screw 24a. Also, at the time of supplying the developer, as described above, the stirring blade 812 of the developer refill container 800 rotates simultaneously with the rotation of the stirring blade 211 of the hopper 21.

When driven as described above, the developer in the hopper 21 is fed into the forward path 22a by the screw 24a, while being stirred by the stirring blade 211. The developer thus fed into the forward path 22a is always supplied to the recovering roller 25 and the photosensitive body 1 opposed to the forward path 22a through the developer supply opening 221. After the developing place 23, facing the recovering roller 25 and the photosensitive body 1, is filled with the developer, an extra portion of the developer is continuously forwarded by the screw 24a, and fed into the backward path 22b through the connecting path 22c located opposite to the hopper 21. Thereafter, the developer is transported in the backward path 22b in the direction opposite to that of the developer supply path 22a, and returns to the hopper 21 again.

In this way, the developer circulating in the developer transporting pipe 22 returns to the hopper 21 at each circulation and is mixed with the developer contained in the hopper 21. Consequently, the developer can be supplied in a homogeneous state at all times. That is, the developer which is returned to the hopper 21 is mixed with the developer contained in the hopper 21 so as to have a homogeneous quality and the mixed developer is used for subsequent development. Because of this advantage, there is no possibility that a part of the developer rapidly deteriorates due to repeated use. In addition, repeatedly used developer is uniformly dispersed in the developer contained in the hopper 21. Thus, stable development is ensured.

(3) Cleaner 3

As shown in FIGS. 1 and 9, the cleaner 3 has a cleaning blade 31 contacting the surface of the photosensitive body 1. The cleaning blade 31 removes the residual developer after transfer operation from the surface of the photosensitive body 1. The cleaner 3 also has a seal 32 for sealing the developer which is subject to cleaning and gathered. The cleaner 3 has a developer restoring path 33 extending in parallel with the axial direction of the photosensitive body 1. In the developer restoring path 33, a screw 34 for transporting the developer is provided adjacent to a side wall. Since the amount of developer transported by the screw 34 is extremely small, a simple structure using a coil spring or the like is adaptable for the screw 34. The screw 34 is connected to the drive mechanism 4. As shown in FIG. 7, one end of the developer restoring path 33 is connected to the hopper 21, and the developer transported by the screw 34 is restored in the hopper 21.

In the cleaner 3 having the above-mentioned structure, the developer recovered by the cleaning blade 31 is gathered to the developer restoring path 33, sequentially transported by the screw 34 driven for rotation in conjunction with the photosensitive body 1 and the like, and then restored in the hopper 21.

In this way, according to the present invention, a space for accommodating the residual developer gathered by the cleaner 3 is unnecessary, and this is effective for realizing a small-sized apparatus. Further, it is possible to effectively consume the developer in an simplified apparatus, since the troublesome process such as discarding the gathered residual developer is not required.

(4) Drive mechanism 4

The drive mechanism 4 includes a motor (not shown). This motor drives and rotates the stirring blade 211 in the hopper 21, the screws 24a and the screw 24b in the developer transporting pipe 22, and the recovering roller 25, in addition to the photosensitive body 1, the transfer roller 500 and a heat roller 610 in the fixing device 600.

Charger 300

The type of the charger 300 is not particularly limited. The present invention employs a corona charger.

Printer head 400

As for the printer head 400, a solid image scanning method, in which an image exposure is performed by arranging light emitting elements (LED) or liquid crystal shutters, can be used. For example, a laser scanner which does not use mechanical scanning is used. However, in the case of a large-sized apparatus, a printer head which performs scanning by deflecting a laser beam can be used.

Transfer roller 500

The transfer roller 500 is located on the side where the paper supply slit 101 and the like is located, with respect to the photosensitive body 1. The transfer roller 500 is always pressed so as to be in contact with the photosensitive body 1 so that a bias voltage for transfer is applied, if required. The transfer roller 500 rotates in the direction shown by an arrow J as shown in FIG. 1.

Fixing device 600

The fixing device 600 has a heat roller 610 having a shaft which is in parallel with that of the photosensitive body 1. A rotation roller 620 is provided opposed to the heat roller 610. The recording paper 700 after the transfer operation is fed between the heat roller 610 and the rotation roller 620 via the transporting path 103. The heat roller 620 is rotated in the direction shown by an arrow K by the drive mechanism 4, as shown in FIG. 1.

The fixing device 600 is provided in a position which is away from the photosensitive body 1, close to the paper discharge slit 104, and between the paper discharge slit 104 and the transfer section. That is, the fixing device 600 is always located above the photosensitive body 1, irrespective of whether the plane 120 or the plane 130 is selected for placing. In this way, the heat of the fixing device 600 does not influence the image forming section around the photosensitive body 1.

Control circuit 900

Figure 10:
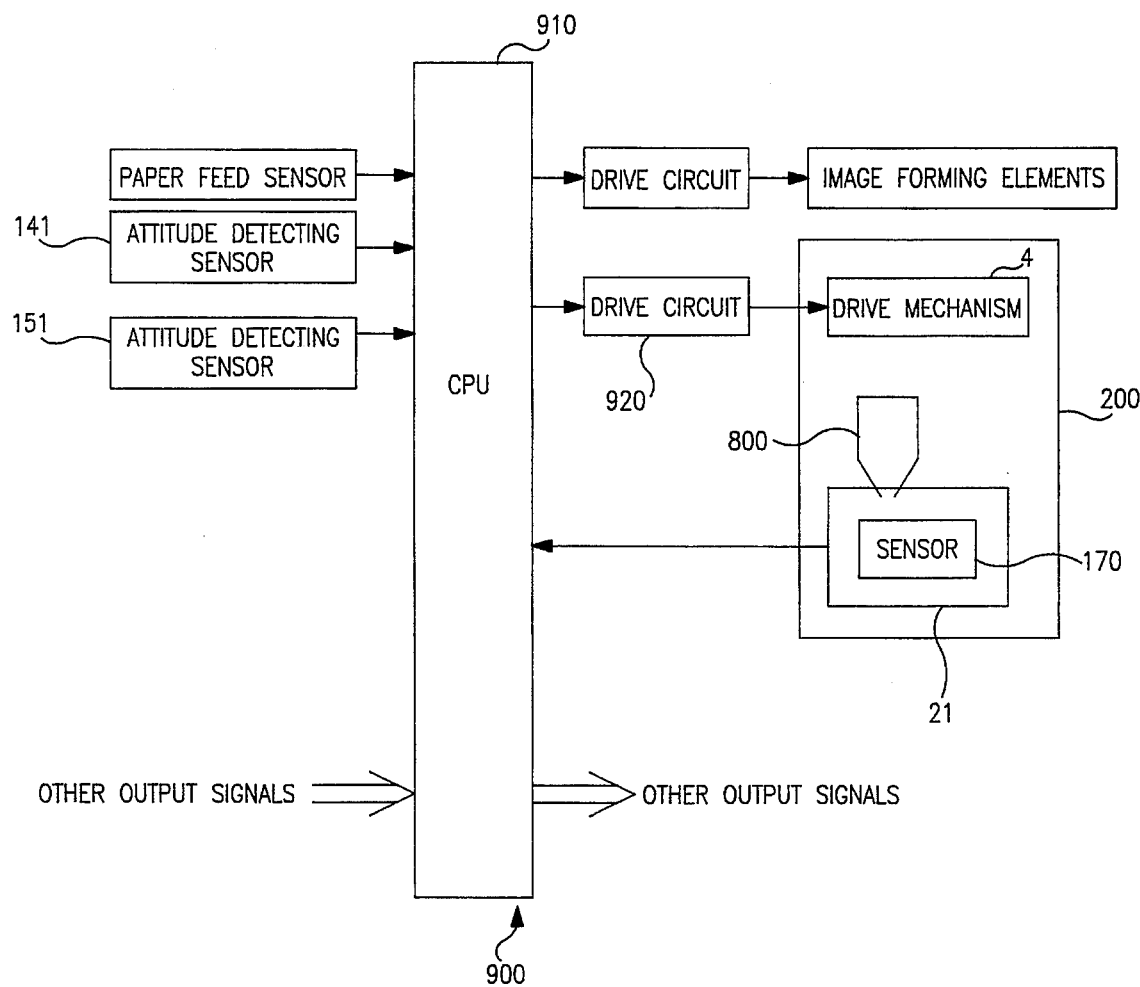
FIG. 10 is a block view of a control circuit of the image forming apparatus of FIG. 1.

FIG. 10 is a block diagram of the control circuit 900 of the present example.

The control circuit 900 which is provided on the case 100 or the developing device 2 has a CPU 910 and a drive circuit 920 for driving the drive mechanism 4. Outputs signals from the developer refill container detecting sensor 170, attitude detecting sensors 141 and 151 and the like are input to the CPU 910.

The control operation at the time of refilling the developer will be described hereinafter.

When the developer refill container detecting sensor 170 detects that the developer refill container 800 is attached to the hopper 21, an output signal indicating the attachment is input to the CPU 910. Upon receiving the signal indicating the attachment, the CPU 910 supplies a command to the drive circuit 920 so that the drive mechanism 4 stops its operation after having worked for a predetermined period of time.

When the developer refill container 800 is attached to the hopper 21 for supplying the developer, the drive mechanism 4 is actuated simultaneously with the attachment of the developer refill container 800, and then the screws 24a and 24b are driven. As a result, the stirring blade 211 of the hopper 21 and the stirring blade 812 in the developer refill container 800 rotate simultaneously.

The predetermined period of time for driving the drive mechanism 4 is set so as to be long enough for the developer in the hopper 21 to reach the far end of the developer supply opening 221 in the forward path 22a facing the photosensitive body 1. Also, if this predetermined period of time is set to be equal to or longer than the time required for the developer from the hopper 21 to be transported via the forward path 22a and the backward path 22b and returned to the hopper 21 again (i.e., the time required for the developer to complete at least one cycle of circulating through the developer transporting pipe 22), the whole range of the developer transporting pipe 22 is filled with the developer, and the developer supply to the photosensitive body 1 is stably performed when an image forming operation is started or resumed.

In the developer transporting pipe 22, the forward path 22a and the backward path 22b are located adjacent to each other along the photosensitive body 1, and the developer is supplied from the developer supply opening 221 to the developing place 23 in the state of the developer keeping in contact with the photosensitive body 1. In such an arrangement, the developer is supplied via the shortest route to the developing place 23. The standby time for starting or resuming the image formation is also shortened.

The drive of the screws 24a and 24b, accompanied by the above-mentioned developer supply, is also started by an operator's switch operation.

The detection of the attitude of the apparatus body will be described.

When the plane 120 or 130 is selected as a bottom, the attitude detecting sensor 141 or 151 is turned ON to supply a detection signal. This detection signal is input to the CPU 910. When the detection signal either from the attitude detecting sensor 141 or 151 is input to the CPU 910, the apparatus body is properly placed, and then the operation of the whole apparatus is enabled. On the other hand, when no detection signal is input from the attitude detecting sensor 141 or 151, the CPU 910 judges that the apparatus body is not properly placed or not in the placement state. In such a case, the operation of the whole apparatus is disabled.

In this way, the apparatus is prevented from being operated in the irregular placement state and/or handling condition. Accordingly, such an erroneous condition is avoided, e.g., as the heat from the fixing device 600 affecting the elements located therearound or as a nonuniform image being developed owing to the uneven distribution of developer. This is effective for eliminating failure of image formation.

EXAMPLE 2

Figure 11:
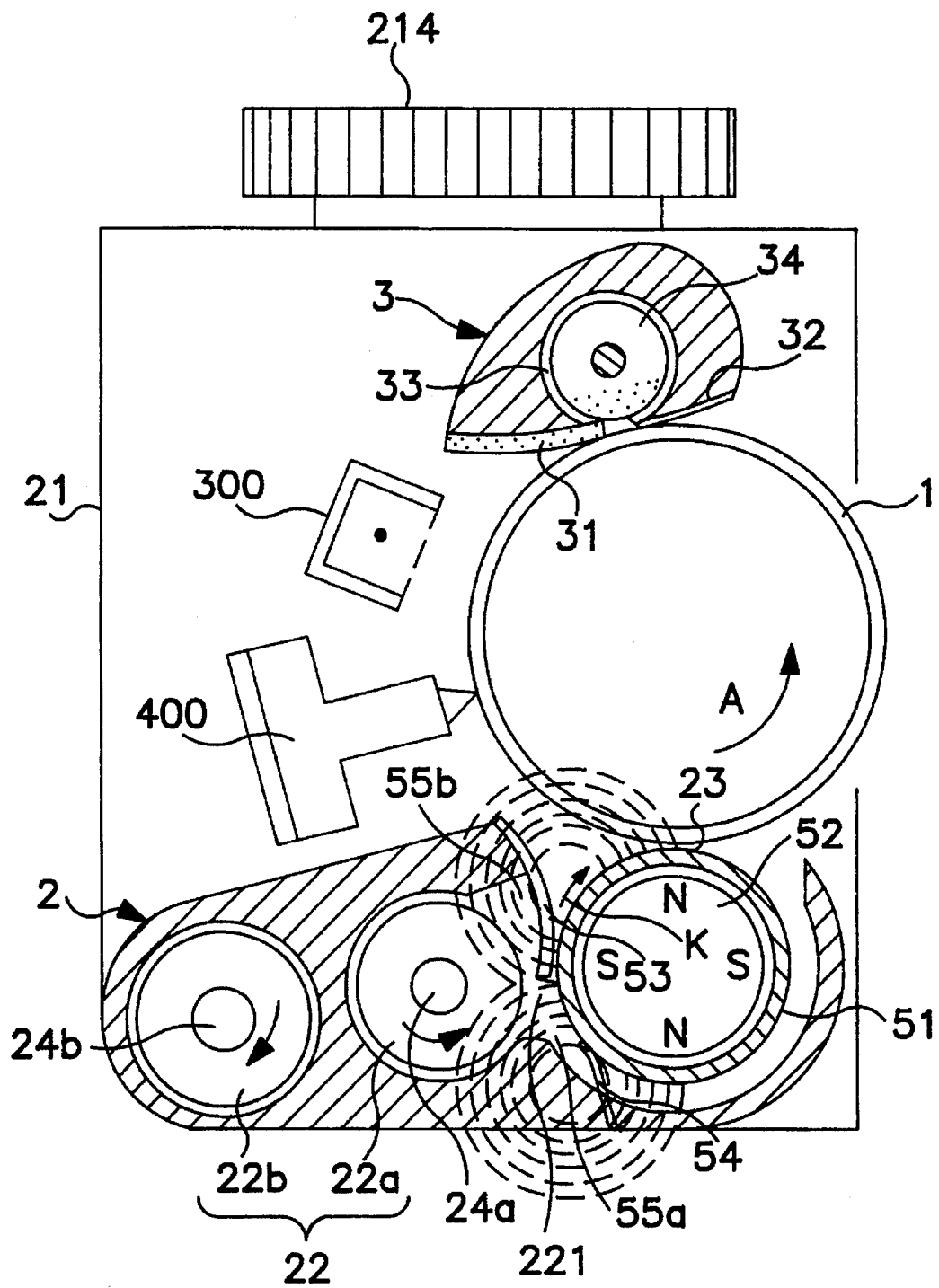
FIG. 11 is a cross-sectional view of an image forming unit of an image forming apparatus of Example 2 according to the present invention.

An image forming apparatus of the second example according to the present invention will be described. FIG. 11 is a partially cross-sectional view showing the image forming apparatus of the present example. The second example differs from the first example only in developing method. The image forming apparatus of the second example has the same construction as that of first example, except for a developing device 2. Therefore, the description of elements identical to those in the first example will be omitted.

A developing device 2 of the present example will be described.

As shown in FIG. 11, the developing device 2 has a hopper 21 for accommodating and supplying a developer, a developer transporting pipe 22 for transporting the developer from the hopper 21, a developing sleeve 51, a magnet 52 disposed in the developing sleeve 51, an elastic blade 53, and a seal 54 for preventing the leakage of the developer. The developing sleeve 51, serving as a developer carrier, rotates in the direction of the arrow K. A thin layer of developer is formed on the surface of the developing sleeve 51 by the elastic blade 53.

The development of the thus constructed developing device 2 will be described.

The developer transported in a forward path 22a through a developer supply opening 221 is attracted by the magnet 52 and adhered to the surface of the developing sleeve 51. The developer thus supplied on the developing sleeve 51 is regulated by the elastic blade 53, and then a thin layer of developer is formed on the developer sleeve 51. In the developing place 23, the thin layer of developer is attracted only to an image area of an electrostatic latent image on a photosensitive body 1, whereby the latent image is developed.

A developer idle space in the forward path 22a, wherein the developer is not held by a screw 24a, is formed into two portions: a portion 55a where the developing sleeve 51 is opposed to the screw 24a, and a portion 55b where the screw 24a is opposed to the elastic blade 53. In this idle space including the portions 55a and 55b, a magnetic field is formed by the magnet 52. The magnetic developer in the portions 55a and 55b is held against the gravity, being restrained by the magnetic force that is at least stronger than the gravity. Therefore, even if an operator variously changes the direction of the apparatus, the developer in these portions 55a and 55b does not freely flow or thickly gather in one direction.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

We claim:

1. An image forming apparatus comprising:

a photosensitive body;

exposure means for irradiating the photosensitive body with a light to form a latent image on the photosensitive body;

developing means for developing the latent image formed on the photosensitive body to form a developer image;

transfer means for transferring the developer image on a recording paper;

fixing means for thermally fixing a transferred image on the recording paper after image transference; and a case for accommodating the photosensitive body, the exposure means, the developing means, the transfer means and the fixing means, the case having at least six planes, two or more of the planes provided around an axis of the photosensitive body being placement planes which are usable as a bottom during an image forming operation;

wherein the fixing means is always above the photosensitive body and developing means, regardless of which plane is selected from the two or more placement planes as a bottom when the apparatus performs the image forming operation.

2. An image forming apparatus according to claim 1, wherein the exposure means is a device of a solid image scanning type, which has an arranged plurality of light emitting elements.

3. An image forming apparatus according to claim 1, wherein the case has a paper supply slit for inserting the recording paper in the apparatus and a paper discharge slit for discharging the recording paper after image transference, on the planes other than the two or more placement planes.

4. An image forming apparatus according to claim 1 further comprising:

detecting means for detecting an attitude of the apparatus and outputting an attitude signal indicating the detected attitude; and control means for inhibiting the apparatus from operating based on the attitude signal from the detecting means when the apparatus is placed irregularly.

5. An image forming apparatus according to claim 1, wherein the developing means comprises:

hopper means for accommodating and supplying a developer;

developer carrier means for transporting the developer carried on a surface thereof to a developing place; and developer circulating means for circulating the developer between the hopper means and the developer carrier means, the developer circulating means including a part of the hopper means and forward means and backward means both of which extend from the hopper means along the photosensitive body;

the forward means and the backward means being located in parallel with the photosensitive body, and the hopper means being located in the longitudinal direction at one end of the photosensitive body.

6. An image forming apparatus according to claim 5, wherein the forward means is arranged to be always below the backward means, regardless of whichever placement plane is selected as a bottom.

7. An image forming apparatus according to claim 5, wherein the backward means is arranged to be always below the forward means, regardless of whichever placement plane is selected as a bottom.

8. An image forming apparatus according to claim 1, wherein the photosensitive body functions as the developer carrier means.

9. An image forming apparatus according to claim 1, wherein the fixing means is always above the exposure means regardless of which plane is selected from the two or more placement planes as a bottom when the apparatus performs the image forming operation.

10. An image forming apparatus comprising:

a photosensitive body;

exposure means for irradiating the photosensitive body with a light to form a latent image on the photosensitive body;

developing means for developing the latent image formed on the photosensitive body to form a developer image;

transfer means for transferring the developer image on a recording paper;

fixing means for thermally fixing a transferred image on the recording paper after image transference; and a case for accommodating the photosensitive body, the exposure means, the developing means, the transfer means and the fixing means, the case having at least six planes, two or more of the planes being placement planes which are usable as a bottom during an image forming operation;

wherein the developing means comprises hopper means for accommodating and supplying a developer; developer carrier means for transporting the developer carried on the surface thereof to a developing place; and developer circulating means for circulating the developer between the hopper means and the developer carrier means, the developer circulating means including a part of the hopper means and forward means and backward means both of which extend from the hopper means along the photosensitive body; and the forward means and the backward means have respective spaces independent of each other, for holding the developer therein and transporting the developer.

11. An image forming apparatus according to claim 10, wherein the exposure means is a device of a solid image scanning type, which has an arranged plurality of light emitting elements.

12. An image forming apparatus according to claim 10, wherein the case has a paper supply slit for inserting the recording paper in the apparatus and a paper discharge slit for discharging the recording paper after image transference, on the planes other than the two or more placement planes.

13. An image forming apparatus according to claim 10, further comprising:

detecting means for detecting an attitude of the apparatus and outputting an attitude signal indicating the detected attitude; and control means for inhibiting the apparatus from operating based on the attitude signal from the detecting means when the apparatus is placed irregularly.

14. An image forming apparatus according to claim 10, wherein the forward means and the backward means are located in parallel with the photosensitive body, and the hopper means is located in the longitudinal direction at one end of the photosensitive body.

15. An image forming apparatus according to claim 14, wherein the forward means is arranged to be always below the backward means, regardless of whichever placement plane is selected as a bottom.

16. An image forming apparatus according to claim 14, wherein the backward means is arranged to be always below the forward means, regardless of whichever placement plane is selected as a bottom.

17. An image forming apparatus according to claim 10, wherein the photosensitive body functions as the developer carrier means.

* * * * *